United States Patent
Berkner et al.

(10) Patent No.: US 7,912,291 B2
(45) Date of Patent: Mar. 22, 2011

(54) FEATURES FOR RETRIEVAL AND SIMILARITY MATCHING OF DOCUMENTS FROM THE JPEG 2000-COMPRESSED DOMAIN

(75) Inventors: Kathrin Berkner, Menlo Park, CA (US); Martin Boliek, San Francisco, CA (US)

(73) Assignee: Ricoh Co., Ltd, Tokyo (JP)

(*) Notice: Subject to any disclaimer, the term of this patent is extended or adjusted under 35 U.S.C. 154(b) by 1405 days.

(21) Appl. No.: 10/705,544

(22) Filed: Nov. 10, 2003

(65) Prior Publication Data
US 2005/0100219 A1 May 12, 2005

(51) Int. Cl.
*G06K 9/46* (2006.01)
*G06K 9/36* (2006.01)

(52) U.S. Cl. ........ 382/190; 382/191; 382/173; 382/218; 382/224; 382/232

(58) Field of Classification Search .................. 382/173, 382/190, 218, 224, 305; 700/100, 104, 3
See application file for complete search history.

(56) References Cited

U.S. PATENT DOCUMENTS

| | | | |
|---|---|---|---|
| 5,933,823 A | 8/1999 | Cullen et al. | |
| 6,363,381 B1 | 3/2002 | Lee et al. | |
| 7,236,637 B2* | 6/2007 | Sirohey et al. | 382/240 |
| 7,474,795 B2* | 1/2009 | Sirohey et al. | 382/240 |
| 2001/0004739 A1* | 6/2001 | Sekiguchi et al. | 707/100 |
| 2002/0044691 A1* | 4/2002 | Matsugu | 382/218 |
| 2003/0113027 A1* | 6/2003 | Chan et al. | 382/240 |
| 2003/0165273 A1 | 9/2003 | Berkner et al. | |
| 2003/0219162 A1* | 11/2003 | Sano | 382/240 |
| 2004/0047615 A1* | 3/2004 | Itoh | 386/111 |
| 2004/0109608 A1* | 6/2004 | Love et al. | 382/224 |
| 2004/0204965 A1* | 10/2004 | Gueck et al. | 705/3 |
| 2005/0084132 A1* | 4/2005 | Wee et al. | 382/100 |
| 2005/0271281 A1* | 12/2005 | Simard et al. | 382/225 |
| 2006/0077408 A1* | 4/2006 | Amirghodsi | 358/1.9 |

FOREIGN PATENT DOCUMENTS

EP 1 329 847 A1 7/2003

OTHER PUBLICATIONS

Chinese Office Action for CN Appln No. CN 200410090496.2 (12 pages).
Text of Chinese Office Action for CN Appln No. CN 200410090496.2 (12 pages).
Srihari, S.N., et al.: "Analysis of Textual Images Using the Hough Transform," Department of Computer Science, SUNY at Buffalo, NT, USA; Machine Vision and Applications (1989) vol. 2, pp. 141-153 (13 pages).
European Search Report, Application No. EP 04 25 6975, dated Feb. 2, 2006, (4 pp.).

(Continued)

*Primary Examiner* — Samir A. Ahmed
*Assistant Examiner* — Ali Bayat
(74) *Attorney, Agent, or Firm* — Blakely, Sokoloff, Taylor & Zafman

(57) ABSTRACT

A method and apparatus for image processing is described. In one embodiment, the method comprises accessing header data from a multi-resolution codestream of compressed data of a first document image, deriving one or more retrieval attributes from the header information, and performing image analysis between the first document image and a second document image based on the one or more retrieval attributes.

24 Claims, 13 Drawing Sheets
(6 of 13 Drawing Sheet(s) Filed in Color)

OTHER PUBLICATIONS

Ricardo L. De Queiroz, et al., "Fast Segmentation of the JPEG Compressed Documents", Journal of Electronic Imaging, SPIE + IS&T, US, vol. 7, No. 2, Apr. 1, 1998, pp. 367-377, XP000750393.

Ramesh Neelamani, et al., "Adaptive Representation of JPEG 2000 Images Using Header-Based Processing", Proceedings 2002 Int'l. Conference of Image Processing (ICIP), Rochester, NY, US, Sep. 22-25, 2002, IEEE, ICIP, New York, NY, US, vol. 2 of 3, Sep. 22, 2002 (pp. 381-384) XP010607340.

Yong Rui, et al., "Image Retrieval: Current Techniques, Promising Directions, and Open Issues", Journal of Visual Communication and Image Representation, Academic Press, Inc., US, vol. 10, No. 1, Mar. 1999, (pp. 39-62) XP002252610.

Ziyou Xiong, et al., Wavelet-Based Texture Features can be Extracted Efficiently from Compressed-Domain for JPEG 2000 Coded Images, Proceedings 2002, Int'l. Conference on Image Processing, NY, US, vol. 2 of 3, Sep. 22, 2002, (pp. 481-484) XP010607365.

European Patent Office (Munich, Germany) Registered Letter for Application No. 04 256 975.6-2001, mailed Mar. 18, 2008, (4 pages).

Gao, Jiang, et al., "An Adaptive Algorithm for Text Detection from Natural Scenes", Proceedings of the 2001 IEEE Computer Society Conference on Computer Vision and Pattern Recognition, Kauai, HI, USA, Dec. 8-14, 2001, (6 pages).

Marco Aiello, et al., "Document Understanding for a Broad Class of Documents," IJDAR 5: 1-16 (2002), (16 pgs.).

H. S. Baird, et al., "Global-to-Local Layout Analysis," from Series in Computer Science, vol. 19, Structural Pattern Analysis, workshop by IAPR Technical Committee on Syntactic and Structural Pattern Recognition, Pont-a-Mousson, France, Sep. 1988. (18 pgs.).

Cattoni, R. et al., "Geometric Layout Analysis Techniques for Document Image Understanding: a Review," ITC-IRST, Trento, Italy, Jan. 1998, pp. 1-68.

Cheng, H. et al., "Trainable Context Model for Multiscale Segmentation," in Proc. IEEE Int'l. Conf. on Image Proc.—ICIP '98, Chicago, IL, Oct. 4-7, 1998 pp. 610-614 (5 pgs.).

Choi, H. et al., "Multiscale Texture Segmentation Using Wavelet-Domain Hidden Markov Models," in Proc. $32^{nd}$ Asilomar Conf. on Signals, Systems and Computers, Pacific Grove, CA, Nov. 1-4, 1998, pp. 1287-1291 (5 pgs.).

Duda, R. O. et al., "Pattern Classification," Chapter 1—Introduction, copyright 2001, $2^{nd}$ Edition, by John Wiley & Sons, New York, ISBN 0-471-05669-3 (22 pgs.).

Jiang, Jianmin et al., "Extracting Shape Features in JPEG-2000 Compressed Images," Lecture Notes in Computer Science vol. 2457, Springer Verlag, Berlin 2002, (10 pgs.).

Neelamani, R. et al., "Multiscale Image Segmentation Using Joint Texture and Shape Analysis," SPIE's $44^{th}$ Annual Meeting, International Symposium on Optical Science and Technology, Aug. 2000, San Diego, CA, (14 pgs.).

Shin, C.K. et al., "Classification of Document Page Images Based on Visual Similarity of Layout Structures," Proc. SPIE, vol. 3967, Document Recognition and Retrieval VII, pp. 182-190, San Jose, CA, 2000, (9 pgs.).

Veltcamp, R. D. et al., "Content-Based Image Retrieval Systems: A Survey," Technical Report UU-CS-200-34, Department of Computing Science, Utrecht University, Oct. 2000, (62 pgs.).

ITU-T Rec. T.800 (2000 FCDV1.0)/ ISO/IEC FCD15444-1:2000 (V1.0, Mar. 16, 2000) "JPEG 2000 Image Coding System," http://www.jpeg.org/public/fcd15444-1.pdf (205 pgs.).

* cited by examiner

FIG. 10

FEATURES FOR RETRIEVAL AND SIMILARITY MATCHING OF DOCUMENTS FROM THE JPEG 2000-COMPRESSED DOMAIN

FIELD OF THE INVENTION

The present invention relates generally to the field of image processing. More particularly, this invention relates to generating features for retrieval and similarity matching using data from one or more multi-resolution codestreams of compressed data.

BACKGROUND OF THE INVENTION

Today, due to the increase in the creation and transmission of electronic document images and scanning of paper documents, many document images are maintained in database systems that include retrieval utilities. Consequently, it has become increasingly important to be able to efficiently and reliably determine whether a duplicate of a document submitted for insertion is already present in a database because duplicate documents stored in the database will needlessly consume precious storage space. Determining whether a database contains a duplicate of a document is referred to as document matching.

The area of image and document retrieval is a well-established field. One goal of image and document retrieval is to convert image information into a form that allows easy browsing, searching, and retrieval. Over the last twenty years, many methods have been developed from text indexing to document matching using complex object descriptions, e.g. faces, animals, etc. Traditionally, the image analysis that is necessary to extract desired information from an image is performed in the pixel domain. As a consequence, speed and computational complexity become an issue for large images such as scanned documents.

Image and/or document retrieval has a rich and long history. Typically, characteristic image features derived from the original image are combined into a one- or multi-dimensional feature vector. Those feature vectors are then used for measuring similarities between images. The features (or attributes) can be divided into two categories, semantic and visual attributes. Semantic attributes are usually based on optical character recognition (OCR) and language understanding. The visual attributes use pure image information and include features like color histograms. Some methods combine the two and link images to nearby text. A good overview of the area of image retrieval is given in "Image Retrieval: Current Techniques, Promising Directions, and Open-Issues," by Y. Rui and T. S. Huang, Journal of Visual Communication and Image Representation, vol. 10, pp. 39-62, 1999.

In currently available image-content based retrieval systems, color, texture and shape features are frequently used for document matching. Matching document images that are mostly bitonal and similar in shape and texture poses different problems. One common document matching technique is to analyze the layout of the document and look for structurally similar documents in the database. Unfortunately, this approach requires computationally intensive page analysis. Thus, most retrieval methods are located in the pixel domain.

Because the majority of document images in databases are stored in compressed formats, it is advantageous to perform document matching on compressed files. This eliminates the need for decompression and recompression and makes commercialization more feasible by reducing the amount of memory required. Of course, matching compressed files presents additional challenges. Some work has been focused in the compressed domain for G4 images. More specifically, the prior art in the compressed domain for G4 images is concentrated on matching G-4 compressed fax documents. For CCITT Group 4 compressed files, pass codes have been shown to contain information useful for identifying similar documents. In one prior-art technique, pass codes are extracted from a small text region and used with the Hausdorff distance metric to correctly identify a high percentage of duplicate documents. However, calculation of the Hausdorff distance is computationally intensive. In another G4-based retrieval method, up- and down-endpoints are extracted from the compressed file (groups of text rows) and used to generate a bit profile. The matching process is divided into coarse matching and detailed matching. Feature vectors derived from the bit profile are used for coarse matching. A small segment of the bit profile is used in the detailed matching. For more information, see U.S. Pat. No. 6,363,381, entitled "Compressed Document Matching," issued to D. S. Lee and J. Hull on Mar. 26, 2002.

In another prior art technique involving compressed documents, segmentation of documents occurs in the compressed JPEG domain. More specifically, in this technique, a single-resolution bit distribution is extracted from a JPEG encoded image by decoding some of the data to extract the number of bits spent to encode an 8×8 block. Based on this distribution, a segmentation operation is performed to segment the image into text, halftone, contone, and background region. For more information, see R. L. deQueiroz and R. Eschbach, "Fast Segmentation of the JPEG Compressed Documents," Journal of Electronic Imaging, vol. 7, no. 2, pp. 367-377, 1998.

In another prior art technique involving feature extraction from the compressed data domain, side information is encoded containing first and seconds moments of the coefficients in each block. The moments are the only information used for retrieval. For more information, see Z. Xiong and T. S. Huang, "Wavelet-based Texture Features can be Extracted Efficiently from Compressed-Domain for JPEG2000 Coded Images," Proc. of Intl' Conf. on Image Processing (ICIP) 2002, Sep. 22-25, 2002, Rochester, N.Y.

In still another prior art technique, features are extracted during decoding of a JPEG 2000 codestream. More specifically, a map resembling an edge map is derived during decoding by localizing significant wavelet coefficients. Note that this technique requires that some decoding of data is performed. For more information, see Jian, J., Guo, B., Li P., "Extracting Shape Features in JPEG-2000 Compressed Images," Lecture Notes in Computer Science, vol. 2457, Springer Verlag, Berlin, 2002.

Visual similarity of binary documents is typically being described by a one-dimensional feature vector that captures global and local characteristics of the document. The feature vector is then used to measure similarity with other feature vectors by evaluating the inner product of the two vectors. Typically used features include global features, projection features, and local features. Global features include a percentage of content (text, image, graphics, non-text), dominant point size for text, statistics of connected components (count, sum, mean, median, std., height, width, area, perimeter, centroid, density, circularity, aspect ratio, cavities, etc.), a color histogram, the presence of large text, and the presence of tables. Projection features include a percentage of content in row/columns, column layout, and statistics of connected components (width, height). Local features include dominant content type, statistics of connected components (width, height, etc.), column structure, region-based color histograms, relative positions of components. These features have only been used in the pixel domain.

For more information on visual similarity of binary documents, see M. Aiello et al., "Document Understanding for a Broad Class of Documents," 2002; U.S. Pat. No. 5,933,823, entitled "Image Database Browsing and Query using Texture Analysis," issued to J. Cullen et al., Aug. 3, 1999; and C. K. Shin and D. S. Doermann, "Classification of Document Page Images Based on Visual Similarity of layout structures," Proc. SPIE, Vol. 3967, Document Recognition and Retrieval VII, pp. 182-190, San Jose, Calif., 2000.

There are a number of other methods and systems for content-based image retrieval for photographic pictures. The survey paper of Y. Rui and T. S. Huang discussed above gives an overview of the type of features derived from images. Another paper entitled, "Content-Based Image Retrieval Systems: A Survey," by R. D. Veltcamp R. C. and M. Tanase, Technical Report UU-CS-200-34, Department of Computing Science, Utrecht University, October 2000, gives an overview of complete systems and their features. One that is widely known is probably QBIC by IBM, but there are many more. The methods discussed in these references are based on processing image values and are not performed in the compressed domain. Typically features derived from images are color histogram, geometric histogram, texture, shape, faces, background, spatial relations between objects, indoor/outdoor, and connected components (size, center, vertical and horizontal projections, etc.). Again, these features are only derived from images that are represented in the pixel domain.

SUMMARY OF THE INVENTION

A method and apparatus for image processing is described. In one embodiment, the method comprises accessing header data from a multi-resolution codestream of compressed data of a first document image, deriving one or more retrieval attributes from the header information, and performing image analysis between the first document image and a second document image based on the one or more retrieval attributes.

BRIEF DESCRIPTION OF THE DRAWINGS

The present invention is illustrated by way of example and not limitation in the figures of the accompanying drawings in which like references indicate similar elements.

The patent or application file contains at least one drawing executed in color. Copies of this patent or patent application publication with color drawing(s) will be provided by the Office upon request and payment of the necessary fee.

FIG. 10 illustrates a multi-scale entropy distribution for an image;

DETAILED DESCRIPTION

Figure 1:
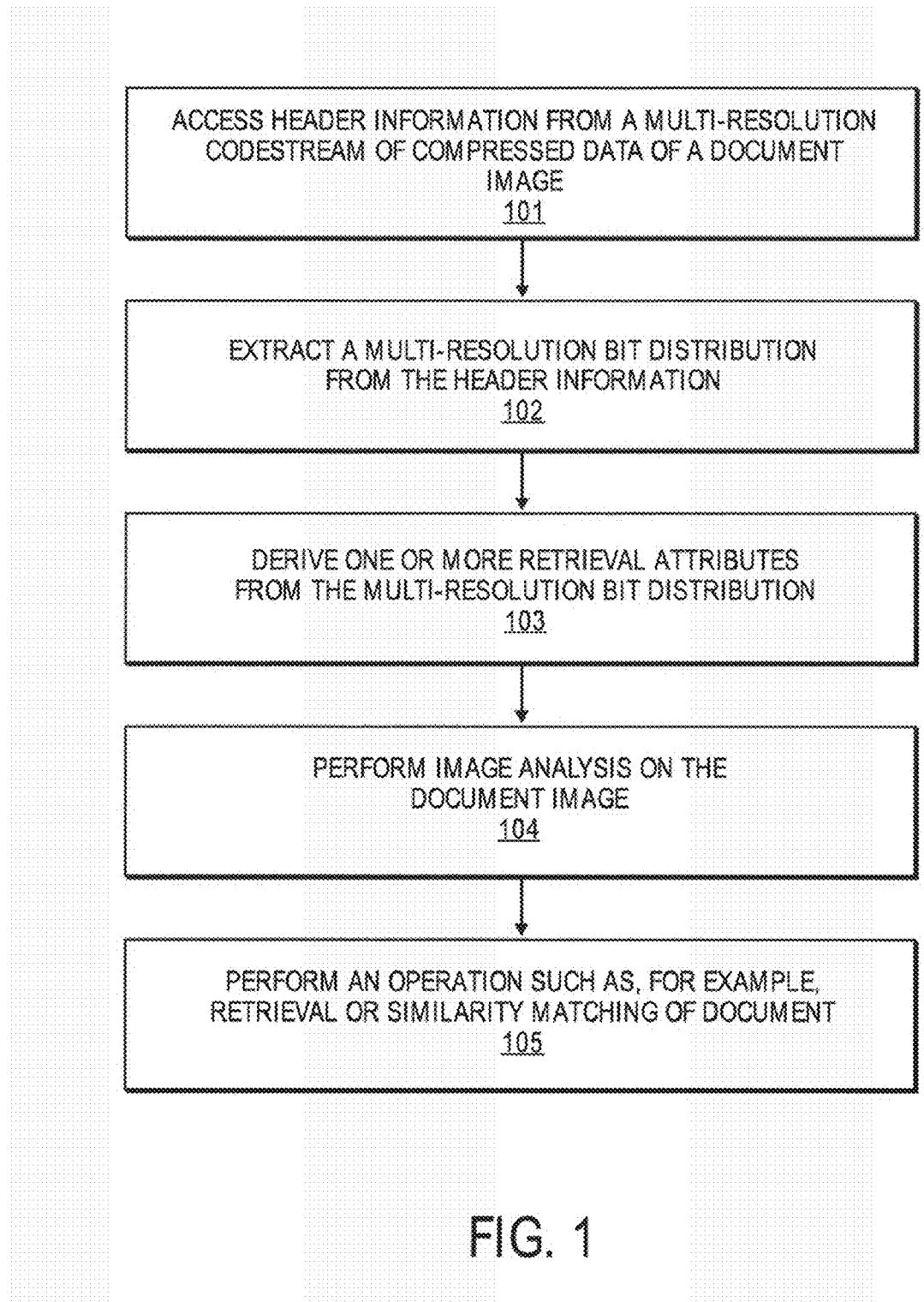
FIG. 1 is a flow diagram of one embodiment of a process for image and or document retrieval.

A method and apparatus for image processing is described. In one embodiment, the method comprises accessing header data from a multi-resolution codestream of compressed data (e.g., a JPEG 2000 standard compliant codestream) of an image and deriving one or more retrieval attributes from the header information. In one embodiment, the header information comprises the number of bits per codeblock. The image may comprise a scanned compound document (i.e., a document having text and image data), a document image, or a photograph.

In one embodiment, accessing the header data from the multi-resolution codestream extracts one or more multi-resolution bit distributions from the header. In one embodiment, the multi-resolution bit distribution provides information of a document image at codeblock resolution and is indicative of information on a visual document layout of the first document image. Each of the multi-resolution bit distributions corresponds to one image component. The one image component may be luminance, chrominance, a color plane, a segmentation plane, JPEG 2000 components, colorfulness, noise, or multi-spectral information.

In one embodiment, the attributes of the document image are generated by processing a multi-resolution bit distribution to create a resolution-level segmentation map from one of the multi-resolution bit distributions. A number of resolution-level segmentation maps may be generated. Each of these segmentation maps may correspond to a color plane, a luminance, and a chrominance plane. In one embodiment, multiple multi-resolution bit distributions are combined into one. This may be done by adding the bits corresponding to the same locations in each of the multi-resolution bit distributions together. One or more of these maps may be weighted differently than the others, so that the resulting composite map is impacted by those segmentation maps differently. The combination of multi-resolution bit distributions may include the use of a mask (e.g., a segmentation plane) to mask a portion of a segmentation map prior to creating a composite multi-resolution bit distribution.

The retrieval attributes may comprise resolution-sensitive features. In one embodiment, the attributes comprise one or more of content percentages relating to an amount of text, image, color and/or background in a document image, statistics of connected components in a resolution-level segmentation map, spatial relationships between components in a resolution-level segmentation map and/or bit distribution images, histograms for code block partition, resolution-level histograms, column layout, and projection histograms of text blocks, background blocks, color blocks, and resolution values in a resolution-level segmentation map.

In one embodiment, the vector of the retrieval attributes is created from the derived retrieval attributes. The vector may be a one-dimensional (1-D) vector and, thus, a 1-D vector is generated from a 2-D document image.

Using the derived retrieval attribute(s), image analysis (e.g., document similarity matching, clustering for document categorization, feature matching) may be performed between two document images based on the retrieval attributes. In one embodiment; image analysis is performed by comparing the first vector with a second vector of one or more retrieval attributes associated with a second document image. Based on the results of the image analysis, and particularly in the case that the image analysis is document similarity matching, a document image may be retrieved, categorized, and/or clustered.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be born in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as, "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such, information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is, not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview of Similarity Matching and Retrieval in the Compressed Domain

FIG. 1 is a flow diagram of one embodiment of a process for image processing in the compressed domain. The process, is performed by processing logic that may comprise hardware (e.g., circuitry, dedicated logic, etc.), software (such as is run on a general purpose computer system or a dedicated machine), or a combination of both.

Referring to FIG. 1, the process begins by processing logic accesses header information from a multi-resolution codestream of compressed data of a document image (processing block 101). The document image can be binary, gray-scale or color. In one embodiment, the document image comprises a compound document (e.g., a document having both text and image data). The document image may be the result of a scanning operation being performed on a hardcopy document. Then processing logic extracts a multi-resolution bit distribution from the header information (processing block 102) and derives one or more retrieval attributes from the multi-resolution bit distribution processing block 103). Thus, the retrieval attributes are derived from the header information.

For retrieval purposes, in one embodiment, the processing logic extracts a multiresolution bit distribution from header data of a JPEG 2000 compliant codetream as described in R. Neelamani and K. Berkner, "Adaptive Representation of JPEG 2000 Images Using Header-based Processing," Proceedings of Int. Conf. Image Processing—ICIP, 2002, vol. 1, pp. 381-384. This distribution provides a description of the information of the image at codeblock resolution (e.g., 32×32 or 64×64 wavelet coefficients) and reflects information on the visual document layout.

Using the retrieval attributes, processing logic performs image analysis on the document image (processing block 104). Using the results of the image analysis, processing logic performs an operation such as, for example, retrieval or similarity matching of documents, categorization, or clusterings (processing block 105).

Thus, the process operates in the compressed data domain to derive visual attributes for documents. In one embodiment, the process operates in the JPEG 2000 compressed data domain in which the header information of a JPEG 2000 compliant codestream is used to derive retrieval attributes. This is in contrast to working in the pixel domain.

Attributes and their Generation

From the multiresolution bit distribution, processing logic computes several features. Even though the algorithmic tools for the feature calculation are borrowed from the prior art, the features themselves are novel since they were computed based on a resolution-level segmentation and multiresolution bit distribution map, a novel type of data set in the retrieval field. The generation of a resolution-level segmentation map from compressed data is described in U.S. patent application Ser. No. 10/044,420, entitled "Header-Based Processing Of Images Compressed Using Multi-Scale Transforms" filed on Jan. 10, 2002, assigned to the corporate assignee of the present invention and incorporated herein by reference, including its generator from the multi-resolution bit distribution, e.g., color layout statistics of connected components. Examples of how features are generated from the compressed data is discussed below.

In one embodiment, in order to determine an attribute, the multi-resolution bit distribution is binarized (i.e., setting one level to 1 and the remaining levels to zero) in a manner well known in the art. This results in a binary map. Using the binary map, well-known prior art methods and algorithms, as described below in more detail, are applied in order to identify an attribute of interest.

There are a number of attributes that may be identified using the header data. For example, margins may be identified. More specifically, margins of constant color (e.g., white) typically have zero bits, whereas dense text areas have a large number of bits at high resolutions. Therefore, by examining the multi-resolution and distribution for zero and non-zero bits, a margin area may be identified.

Figure 5:
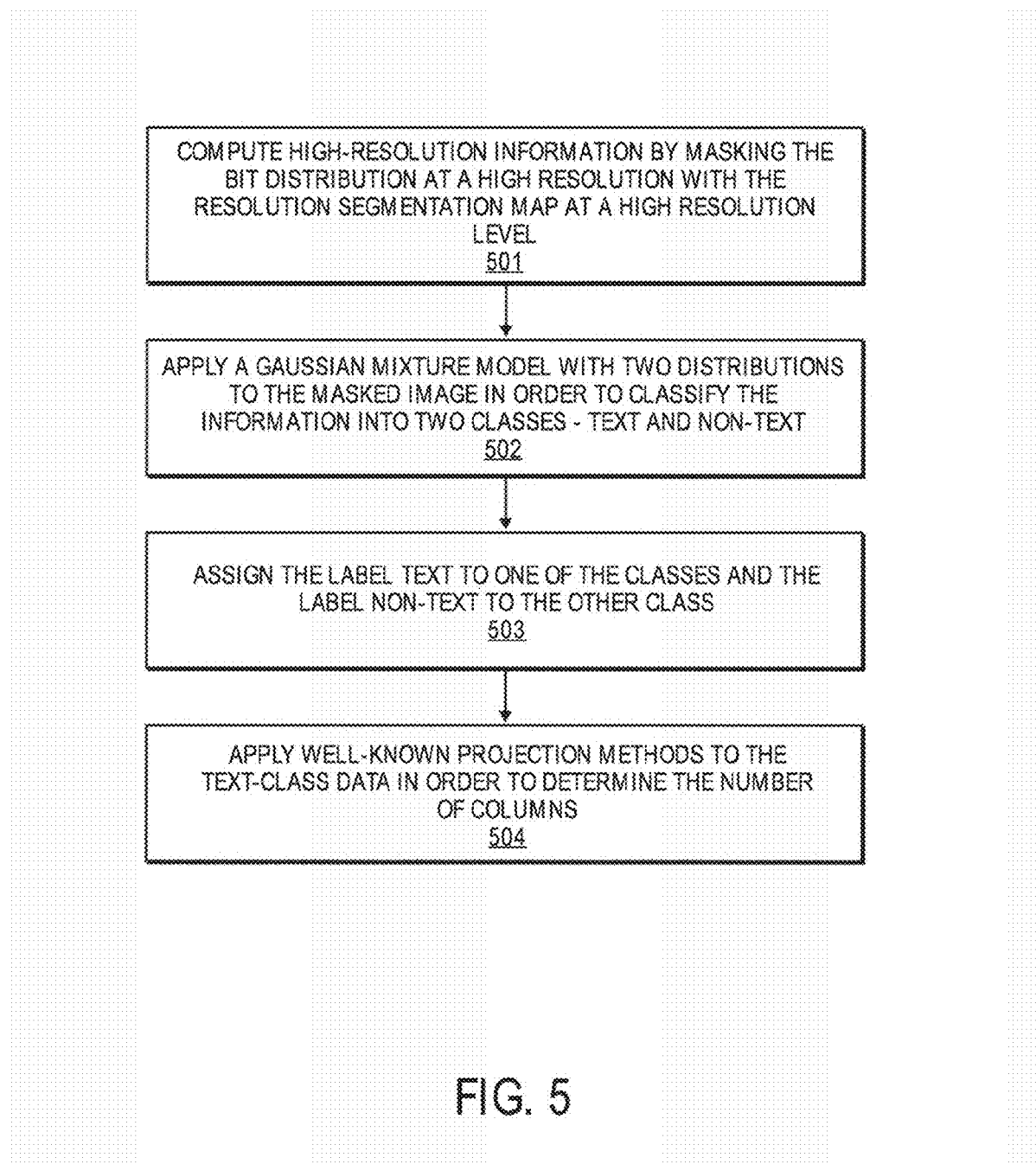
FIG. 5 is a flow diagram of one embodiment of a process for calculating a column layout.

Similarly, image areas may be identified. In one embodiment, image areas in text documents can be distinguished by the human observer from text areas due to the different numbers of bits at a high resolution. As a consequence, many well-known algorithmic methods can be applied to the muilt-iresolution bit distribution and features can be derived. For example, see the discussion with respect to FIG. 5 given below. Since the size of the header data is very small compared to the original image size simple algorithms are fast and more complicated algorithms affordable.

In one embodiment, features similar to those used, for example, U.S. Pat. No. 5,933,823, entitled "Image Database Browsing and Query using Texture Analysis," issued to J. Cullen, J. et al., Aug. 3, 1999, can be derived. Note, however, that the bit distribution has different properties than the pixel values; that is, the bit distribution does not contain any real color values (i.e., black vs. white, blue vs. red, etc.), but only knowledge about existence or non-existence of visual information. For example, when determining the column layout of a document, there is no explicit text information, nor black and white regions since color is not present.

Figure 2:
FIG. 2 is an example of a color compound document.
Figure 3:
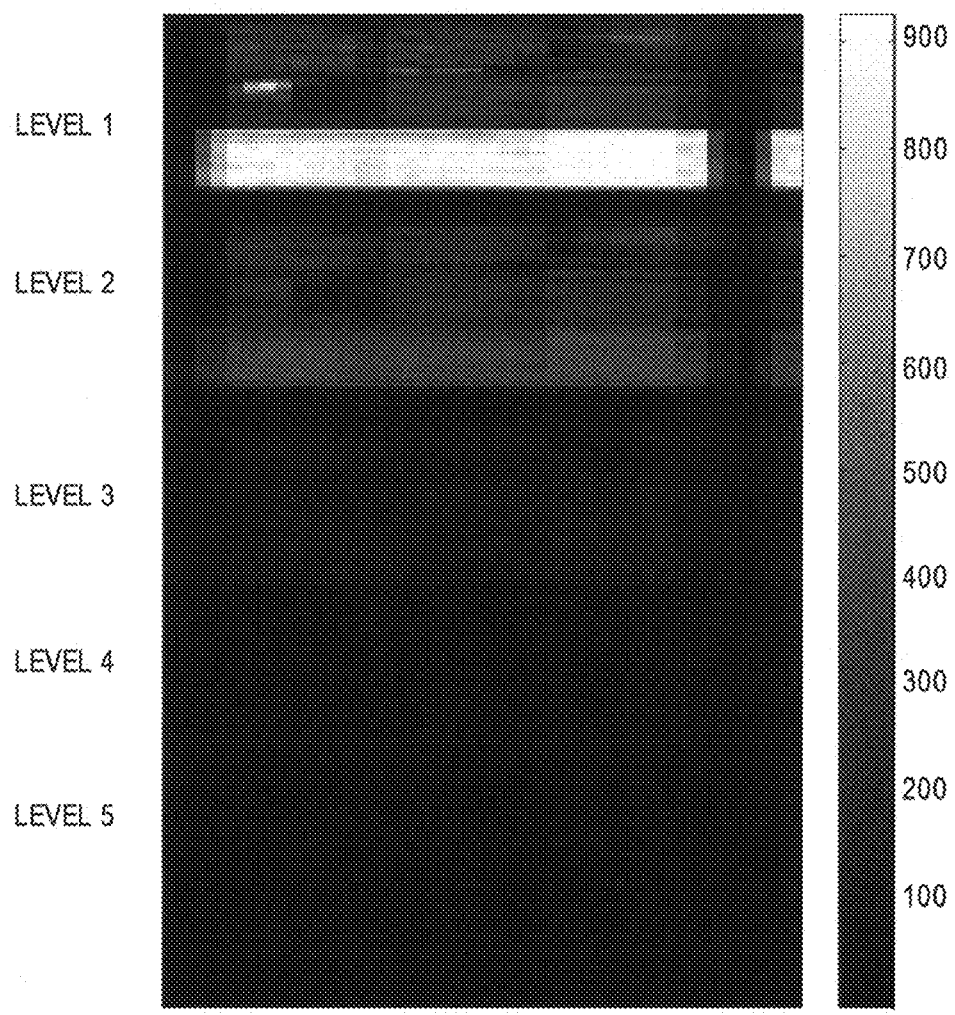
FIG. 3 is an example of a multiresolution bit distribution for five levels.

FIG. 2 is an example of a color compound document. FIG. 3 shows an example of a multi-resolution bit distribution for the luminance component of a five-level decomposition of the example document from FIG. 2. Referring to FIG. 3, the top shows bits at the highest resolution, the bottom at the lowest resolution.

Figure 4:
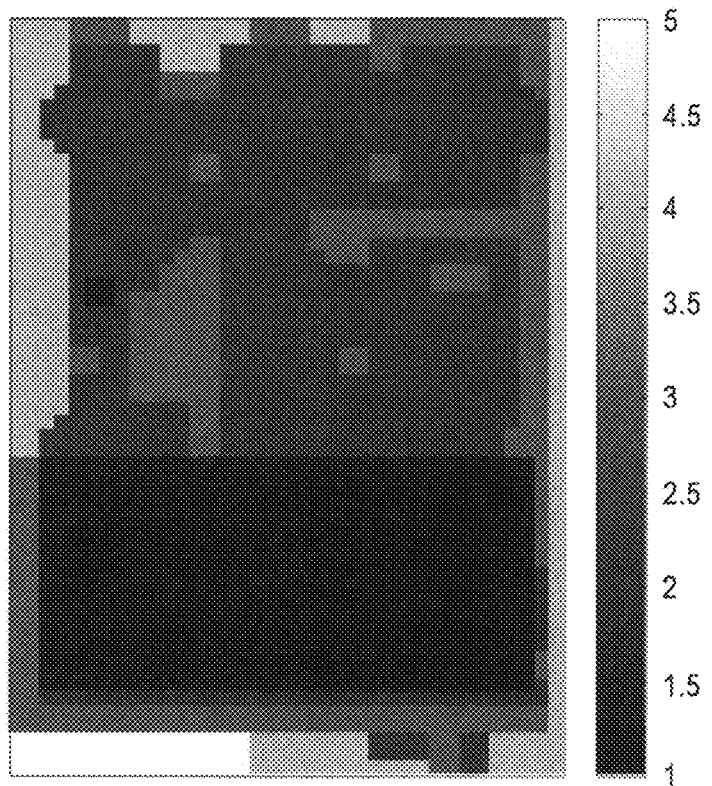
FIG. 4 is a resolution-level segmentation map for the example image from FIG. 2.

Groups of image areas with similar resolution properties can form a class with a specific resolution label. In other words, image areas of a document image are created using the bit distribution and then they are compared and processed based on one or more criteria. FIG. 4 shows show the resolution level map for the image example from FIG. 2. Referring to FIG. 4, different gray values correspond to different resolution levels (black=1, . . . white=5).

There may be multiple segmentation maps, each associated with a different component, or plane (e.g., a color plane, a luminance plane, a chrominance plane). There may be a number of ways to obtain segmentation maps. The segmentation map may be a JPEG 2000 map, or one based on data segmented for certain file formats, such as, for example, JPM or PDF. In certain file formats where different objects are compressed separately (e.g., text and size segmented in JPM), the multi-bit distributions of objects may be combined. In any case, segmentation objects or components may be binarized to obtain a bit distribution.

From the resolution-level segmentation maps for the three different color planes Y, Cb, Cr, common features typically used to describe topological and metric properties of shape as well as convexity, skeleton, etc. can be derived using well-known procedures. For example, exemplary procedures are described in R. O. Duda and P. E. Hart, "Pattern Classification and Scene Analysis," John Wiley & Sons, New York, 1973. Connected components with statistics, spatial relations between components, histograms, etc., can be computed and organized in a feature vector. The features can be divided into global, local, and projection features, and can be derived for luminance and chroma channels.

Global features are those that correspond to the image as a whole. Exemplary global features include the percentage of content (e.g., text, image, color, background); statistics of connected components in segmentation map (e.g., count, sum, mean, median, std., height, width, area, perimeter, centroid, density, circularity, aspect ratio, cavities, etc.); and resolution-level histograms. Resolution-based histograms are created by dividing a segmentation map into blocks and counting the number of blocks that have the same resolution value and meet a predetermined criteria for the image.

Local features are those corresponding to individual groups of codestream blocks. Local features may include: relative positions of components in resolution-level maps or bit distribution images (e.g., top-right, etc.); statistics of connected components in resolution-level map or bit distribution images (e.g., width, height, centered, etc.); and histograms for code block partition at a low resolution. A bit distribution image is an image generated by the multi-resolution bit distribution. The relative positions of components may comprise the spatial locations of text regions with respect to image regions. This may include whether space exists between such regions. Once such features are identified, documents having similar features may be identified. Histograms may be generated by dividing the bit distribution into blocks and determining the number of bits in each block because different colors or other features have different bit distributions.

FIG. 5 is a flow diagram of one embodiment of a process for calculating column layout. Referring to FIG. 5, processing logic computes high-resolution information. The highest resolution level depends on the dpi resolution of the original image. In general, the support of a code-block in the spatial domain should cover average character in the document. That means the highest resolution suitable resolution is given by the smallest decomposition level m, such that $$2^{(m+1)} \text{code\_block\_size} > \text{height\_of\_average\_character\_in\_pixels}.$$

For 300 dpi documents, an average character size is 30 pixels. Given a code blocks of size 32×32 coefficients, the resolution level m should be m=1. For 600 dpi documents (average character size=60 pixels), m=2.

Figure 6A:
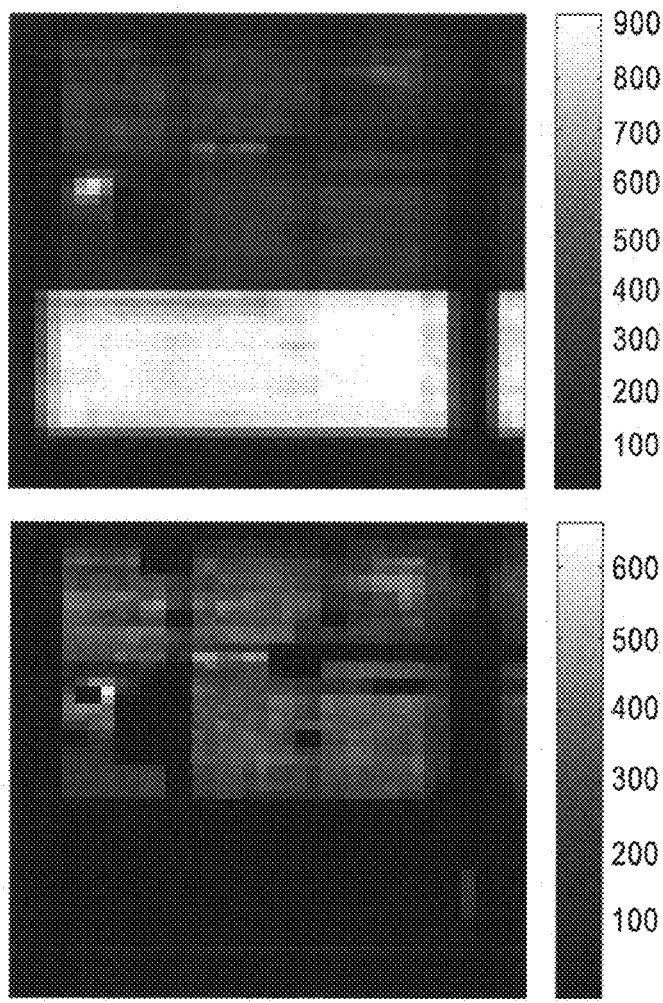
FIG. 6A is an example of high-resolution bit distribution (top), masked with high-resolution level segmentation map (bottom) used for computation of column-layout.

In one embodiment, the high-resolution information is computed by masking the bit distribution at a high resolution with the resolution segmentation map at a high resolution level (processing block 501). An exemplary result is shown in FIG. 6A.

Next, processing logic applies a Gaussian Mixture Model with two distributions to the masked image in order to classify the information into two classes—text and non-text (processing block 502). Afterwards, processing logic assigns the label text to one of the classes and the label non-text to the other class (processing block 503). This additional step is used because no information of the actual color is available. Lastly, processing logic applies well-known projection methods to the text-class data in order to determine the number of columns (processing block 504). See Baird, H. S., "Global-to-Local Layout Analysis." Proc. of IAPR Workshop on Syntactic and Structural Pattern Recognition, pp. 136-147, Pont-a-Mousson, France, September 1988 and Srihari, S. N., Govindaraju, V., "Analysis of Textual Images Using the Hough Transform," Machine Vision and applications, vol. 2, no. 3, pp. 141-153, 1989.

Due to the fact that the bit distribution shows areas of codeblock information, but not detailed color information, some of the algorithms for feature detection in the prior art are modified and adapted to the data. For example, with respect to column layout, traditionally, column layout is derived from analyzing white space on a page. Since the codeblock resolution at lower resolutions corresponds to pixel resolution that may be too coarse to capture white space between columns, only the high-resolution information is used to compute column layout.

In one embodiment, column layout is determined by projection profile methods. An overview over two different techniques is presented in Cattoni, R, Coianiz, T., Messelodi, S., Modena, C. M., "Geometric Layout Analysis Techniques for Document Image Understanding: A review," Technical Report, IRST, Trento, Italy, 1998. One method is based on the observation that projection profiles of text regions contain peaks and valleys that correspond to text lines and between lines spaces, respectively (Srihari, S. N., Govindaraju, V., "Analysis of Textual Images Using the Hough Transform," Machine Vision and applications, vol. 2, no. 3, pp. 141-153, 1989). Positions of base and top lines in correspondence of the peaks are estimated. The other method, "global-to-local" defines a parametric model of a generic text column (Baird, H. S., "Global-to-Local Layout Analysis." Proc. of IAPR Workshop on Syntactic and Structural Pattern Recognition, pp. 136-147, Pont-a-Mousson, France, September 1988).

Projection features may include: projection histograms (horizontal and vertical) of: text blocks, image blocks, background (e.g., margins) blocks, color blocks, resolution level values in segmentation map; and column layout. Projection histograms may be used to determine the number of columns and the number of rows.

In general, it is possible to use the multiresolution bit distribution to segment a multi-resolution bit distribution into color and non-colored regions and/or text and background and image regions.

Signature (Spatial Layout Mask) for Similarity Matching

Figure 6B:
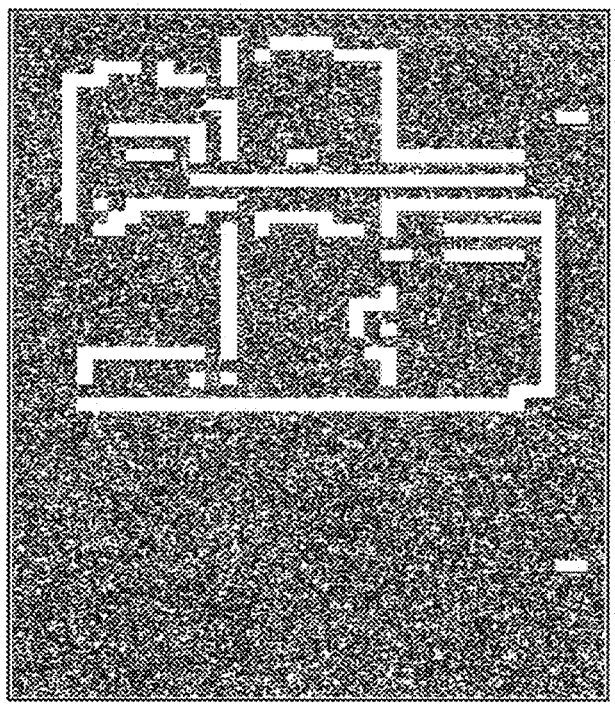
FIG. 6B is a contour map for the masked high-resolution bit distribution in FIG. 6A.

In one embodiment, processing logic derives a spatial layout contour map from the masked high-resolution bit distribution. This may be performed in a similar conceptual way to the approach of calculating a spatial layout signature by extracting up- and down-endpoints from the compressed G4 file. See U.S. Pat. No. 6,363,381, entitled "Compressed Document Matching," issued to D. S. Lee and J. Hull on Mar. 26, 2002. For this purpose an edge detection algorithm is applied to provide the contours. More specifically, a mask is applied to obtain the text regions and then an edge filter is applied to compute edges (i.e., the outline of text regions). This results in a binary image. The resulting contour map is shown in FIG. 6B.

Given the contour maps for a collection of documents, in one embodiment, document similarity matching is performed by computing correlations or the Hausdorff distance between two contour maps. Correlations or the Hausdorff distance may be computed in the same manner as described in U.S. Pat. No. 6,363,381, entitled "Compressed Document Matching," issued to D. S. Lee and J. Hull on Mar. 26, 2002.

It is possible to repeat that correlation-computing step for other resolutions and compute matches based on several scales of contour maps. The contour map described above is derived from the high resolution masked image. In a similar way, contour maps can be derived from lower resolution masked images by masking bit distribution at a given resolution m with the resolution segmentation map at resolution level m. The correlation between sets of contour maps at various resolutions can be used as a similarity measure Sim. An example is as follows:

$$\mathrm{Sim}(im1,im2) = \Sigma_m \mathrm{correlation}(CM_{im1}(m), CM_{im2}(m)),$$

where $CM_{im1}(m)$ is the contour map of image 1 at resolution level m.

Due to the coarse code block resolution, this matching process is relatively insensitive with respect to skew. Since the multiresolution bit distribution provides information of bits per code-block and since a code block covers a spatial area of at least twice the code-block dimensions (e.g. 64×64 pixels for 32×32 code block) encoding documents with small skew angle will result in a similar multi-resolution bit distribution to that for skew angle 0. For skew angles >30 degree the bit distributions will likely differ. Typically, page segmentation algorithms are applied after skew correction has been performed. A review on skew correction is given in Cattoni, R, Coianiz, T., Messelodi, S., Modena, C. M., "Geometric Layout Analysis Techniques for Document Image Understanding: A review," Technical Report, IRST, Trento, Italy, 1998.

Layering of the JPEG 2000 Codestream

Figure 7:
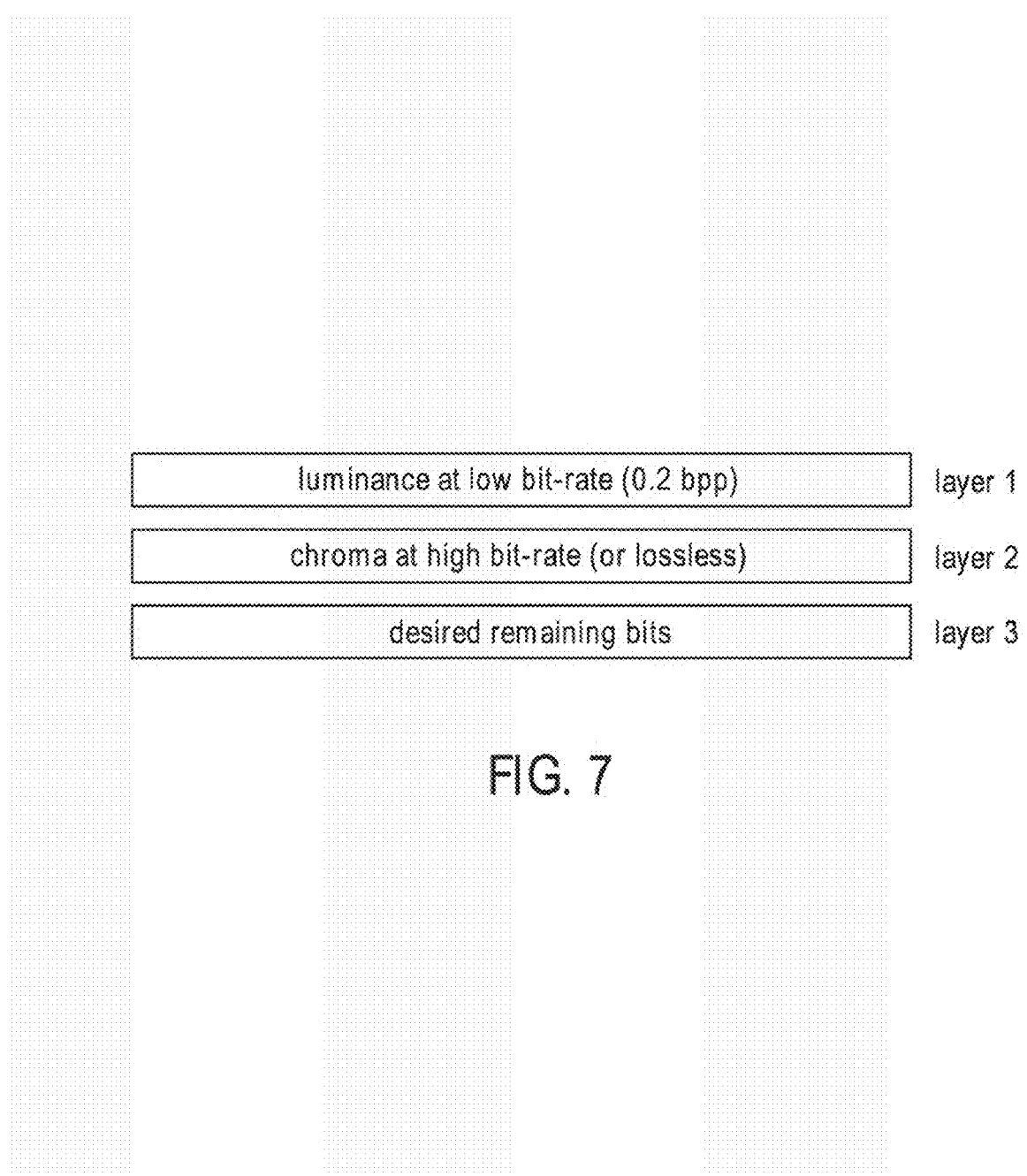
FIG. 7 is a diagram illustrating one embodiment of a layering scheme of a JPEG 2000 code stream for color documents in retrieval applications.

JPEG 2000 supports layering of the coded data. The JPEG 2000 standard does not describe how to assign those layers. For retrieval and similarity matching purposes, in one embodiment, the layering scheme of at least three layers may be used, such as shown in FIG. 7. Referring to FIG. 7, the first layer is luminance at a low bit rate (e.g., 0.2 bpp), the second layer is chroma at a high bit rate or lossless, and the third layer is the remaining bits. The third layer may be split into various layers depending on the application. The data from these layers may be accessed and utilized in the same manner as described above, including combining bit distributions where desired.

An Exemplary Retrieval/Matching System

Figure 8:
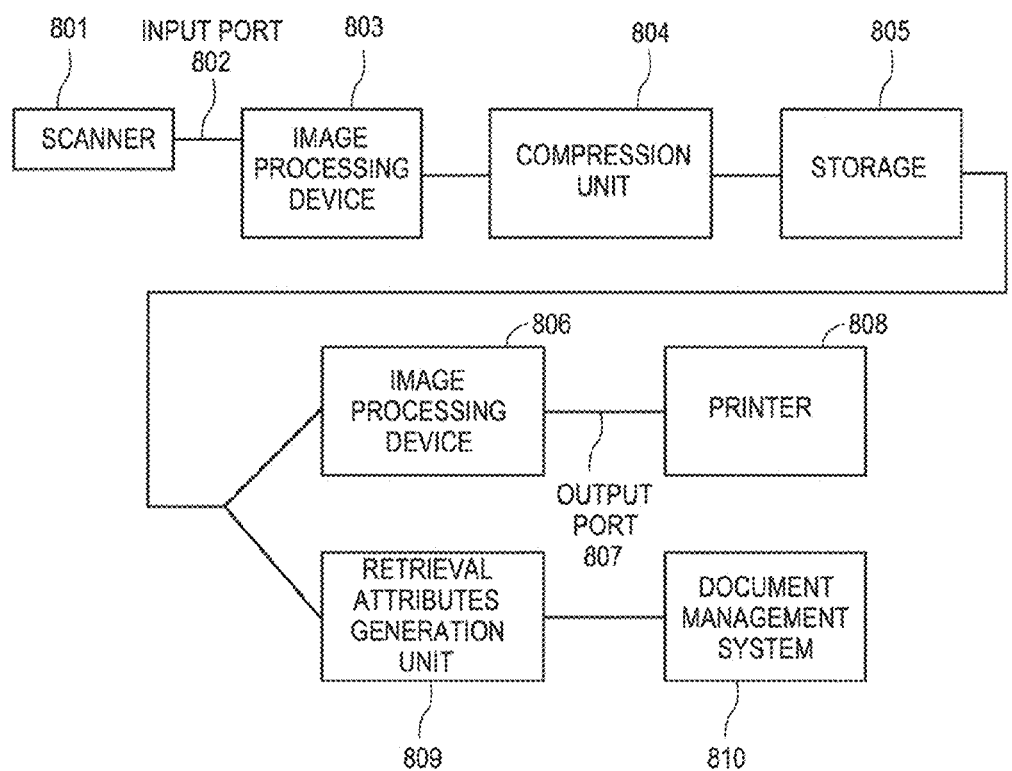
FIG. 8 is a diagram illustrating an MFP with J2K compression/decompression in connection with a document management system.

The teachings described herein for header-based retrieval and similarity matching may be applied to a document management system that accesses a multi-function peripheral (MFP). FIG. 8 is a block diagram of one such integration. Referring to FIG. 8, an input port 802 receives a document image. A scanner 801 may be coupled to input port 802 to create the document image. The document image is received by a first image processing device 803 that is coupled to input port 802 and performs image processing functions such as, for example, gamma correction and noise removal. Next compressor 804 compresses the document image and stores it in storage 805.

After storage, retrieval attributes calculation unit 809 generates attributes of the document image using at least one multi-resolution bit distribution extracted from a header in a multi-resolution codestream of compressed data of the first document image in the same manner as described above. The results produced by retrieval attributes calculation unit 809 are sent to document management system 810, which performs similarity matching between the document image and one or more other document images of one or more other documents. The documents may be retrieved using a document management system 810. A document is considered to match the original document if it meets a similarity threshold. Such a process of matching documents based on a predetermined threshold as to their similarity is well-known in the art.

Image processing unit 806 is coupled to storage 805 to perform functions, such as, for example, halftoning, etc. An output port 807 is coupled to storage 805 to output one or more retrieved documents, if any. Also a printer 808 may be coupled to the output port 807 to print the at least one retrieved document.

JPEG 2000-based retrieval features could also be useful for a low-level retrieval step that is followed by a high-level retrieval step performed on selected image areas in the pixel domain. The low-level retrieval step is one that uses the features described above to identify similar documents in the compressed data domain, while the high-level retrieval step are operations (e.g., OCR, color histogram, etc.) that are performed on a document image that is in the pixel domain.

Thus, the present invention is applicable to image retrieval and similarity matching derived from the compressed multi-resolution domain (e.g., JPEG 200 domain), using at least one multiresolution bit distribution, which provides information indicative of the number of bits that are necessary to describe the content of image blocks at various resolutions.

Generation of a Segmentation Map

In one embodiment, information in the header is used to generate an entropy distribution map that indicates which portions of the compressed image data contain desirable data for subsequent processing. An example of such a map is given in FIG. 1. Other maps are possible and may indicate the number of layers, which are described below with the description of JPEG 2000, to obtain a desired bit rate (particularly for cases when layer assignment is related to distortion) or the entropy distribution for each of a number of bit rates. In the latter case, each rectangular area on the map has a vector associated with it. The vector might indicate values for multiple layers.

Image representation formats that utilize multi-scale transforms to compress the image description bits typically incorporate many organizational details in the header, so that pixel-wise description about the digital image can be decoded correctly and conveniently. JPEG 2000 is an example of an image compression standard that provides multi-scale bit distributions in the file header. Often the image description bits are divided among smaller units, and the number of bits allocated by the encoder to these units is stored in, the image header to facilitate features such as partial image access, adaptation to networked environments, etc. Using information theoretic conventions, the allocated number of bits is referred to as the entropy of each small unit. Entropy distributions used by image coders provide an excellent quantitative measure for visual importance in the compressed images. For lossless compression, an image coder uses more bits to describe the high activity (lot of detail) regions, and less bits to convey the regions with little detail information. For lossy compression, the image coder typically strives to convey the best possible description of the image within the allocated bits. Hence, the coder is designed to judiciously spends the available few bits describing visually important features in the image.

Figure 10:
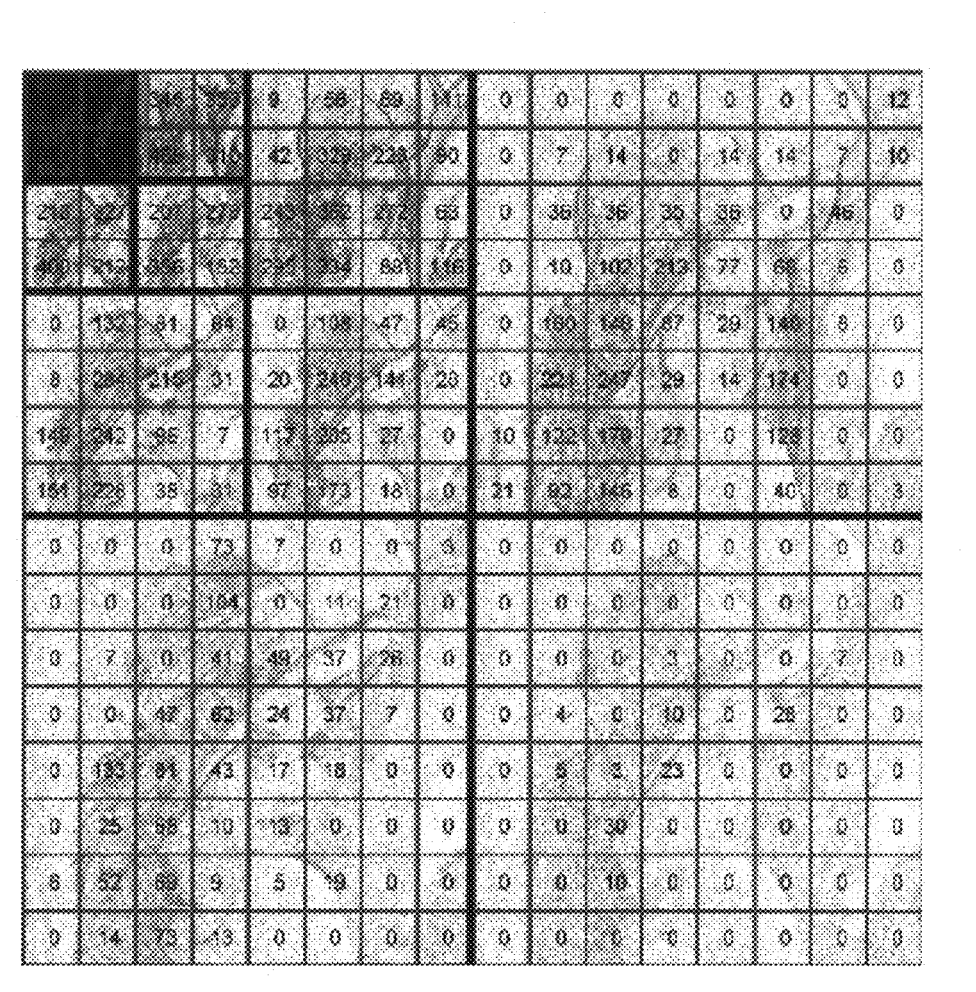

FIG. 10 illustrates one multi-scale entropy distribution for an image. The image undergoes JPEG 2000 encoding initially. The underlying patterns are the wavelet coefficients of the image. The thin lines denote the JPEG 2000 division of the wavelet domain coefficients into code blocks, and the thick lines separate the different wavelet sub-bands. In JPEG 2000, the coder performing the encoding process allocates and divides the wavelet domain coefficients into small units called code blocks. The numbers shown in each square are the bits or entropies allocated to the respective code blocks by the JPEG 2000 coder operating at 0.5 bits per pixel using three levels of decomposition. These numbers represent the multiscale entropy distribution.

The entropy allocations, which are accessed using only the JPEG 2000 file header, provide a good measure for the visual importance of the different features at various scales and help distinguish between the different types of important image features characterized by different multiscale properties. For example, to describe the feather region in the image, a multi-scale image coder spends many bits coding the fine scale coefficients and less on coarse scale coefficients than, e.g., fine scale coefficients corresponding to the feather region. On the other hand, to code the face region, a multi-scale image coder spends more bits coding the intermediate scale coefficients corresponding to the face region. The smooth background receives few bits. Thus, the multi-scale entropy distribution provides significant information about the underlying image features. Assuming knowledge of the multi-scale entropy distribution is obtained from headers, one or more operations may be performed. These operations may be, for example, image segmentation, automatic active region identification and scaling, and/or adaptive image scaling.

JPEG 2000 is a standard to represent digital images in a coherent code-stream and file format (See, e.g., ITU-T Rec. T.800|ISO/IEC 15444-1:2000, "JPEG 2000 image coding standard," in www.iso.ch). JPEG 2000 efficiently represents digital image by efficiently coding the wavelet coefficients of the image using the following steps. A typical image consists of one or more components (e.g., red, green, blue). Components are rectangular arrays of samples. These arrays are optionally divided further into rectangular tiles. On a tile-by-tile basis, the components are optionally decorrelated with a color space transformation. Each tile-component is compressed independently. Wavelet coefficients of each color component in the tile are obtained. The wavelet coefficients are separated into local groups in the wavelet domain. These are called code blocks. The code blocks are optionally ordered using precincts. Arithmetic coding is used to code these different wavelet-coefficient groups independently. The coded coefficients are optionally organized into layers to facilitate progression. Coded data from one layer of one resolution of one precinct of one component of one tile is stored in a unit called a packet. In addition to coded data, each packet has a packet header. After coding, a tile-component is optionally divided into tile-parts, otherwise the tile-component consists of a single tile-part. A tile-part is the minimum unit in the code-stream, that corresponds to the syntax. A JPEG 2000 codestream consists of syntax (main and tile-part headers, plus EOC) and one or more bitstreams. A bitstream consists of packets (coded data for codeblocks, plus, any instream markers including instream packet headers). The organizational information to parse the coded data, the packet headers, may be stored in the main header, tile headers, or in-stream. JPEG 2000 has main headers and tile headers, which contain marker segments. JPEG 2000 also has packet headers, which may be contained in marker segments, or be in-stream in the bit stream. Headers are read and used as inputs to processing which obtains a multiscale entropy distribution. Table 1 summarizes the information contained in various JPEG 2000 headers that is relevant to header-based processing.

TABLE 1

Uses of JPEG 2000 file header information

| Header Entries | Type of Information | Role to Entropy Estimation | Main | Tile | In-stream |
|---|---|---|---|---|---|
| Packet header (PPM, PPT, in-stream) | Length of coded data; number of zero bit planes and coding passes | Provides entropy of each code block of each sub-band of each component of tile. Facilitates estimation of entropy allocation at lower bit rates. Provides rough estimate of coefficient energies and magnitudes. | ✓ | ✓ | ✓ |
| Packet length (PLM, PLT) | Lengths of packets | Facilitates faster estimation of code block entropies for some JPEG 2000 files | ✓ | ✓ | |
| Tile-length part (TLM, SOT) | Lengths of tiles | Provides entropy of each tile. Facilitates local and global entropy comparison | ✓ | ✓ | |
| SIZ | Size of image | Helps determine location of code blocks | ✓ | | |
| COD, COC, QCC, QCD | Coding style | Number of transform levels, code block size, maximum size of coefficients, precinct information | ✓ | ✓ | |
| RGN | Region information | Estimate size and importance of region of interest. Alters meaning of most of the above information | ✓ | ✓ | |

In the case of the packet header (PPM, PPT, in-stream), it may be in either the main header, tile header or in-stream, but not a combination of any two or more of these at the same time. On the other hand, the packet length and tile-length part may be in the main header or the tile headers, or in both at the same time.

Estimation of Low Bit Rate Image from High Bit Rate Image

The multi-scale entropy distribution at lower bit rates provides a robust measure for visual importance. At higher bit rates the existence of image noise, which is present in digital images from any sensor or capture device, corrupts the overall entropy distribution. Depending on the application, images are encoded losslessly or lossy. The layering scheme in the JPEG 2000 standard could be used to order the codestream of a lossless or high bit rate encoded image into layers of visual or Mean-Squared-Error (MSE)-based importance. In this case, a low bit rate version of the image could be obtained by extraction of information from only the packets in some layers and ignoring the packets in the other layers. If such layering is not employed by the encoder, the packet length information from the header can yield the multi-scale entropy distribution only at the bit rate chosen by the encoder, e.g. lossless, high bit rate or low bit rate.

If the encoder choice was lossless or high bit rate, an estimation of a low bit rate version of the image is obtained before applying any of the image processing algorithms explained later. One embodiment for performing such an estimation is described below. To determine the order in which bits are allocated, information of the maximum of absolute values of coefficients and the number of coding passes in a codeblock from headers as well as heuristic and statistical information on visual or (MSE)-based importance of subbands at various resolution levels is used.

The estimation successively subtracts bits from the total number of bits per codeblock until a given bit rate for the image is reached. The order of subtraction is the reverse of a bit allocation algorithm. The allocation algorithm may be the same as the one used by the encoder, but it is not required to be.

From the packet header of a JPEG 2000 file the length of a codeblock, i.e. the number of bits "B", number of zero bit-planes "NZ" and the number of coding passes "CP" used during encoding are available. From the number of zero bit-planes, an estimation of the maximum value of absolute values of coefficients in the codeblock, $2^{maxB}$, can be obtained by computing the maximum non-zero bitplane $$\text{Max}B = MSB(\text{codeblock subband}) - NZ, \quad (1)$$

where MSB is the maximum number of bitplanes of the specific subband of which the codebock belongs. MSB is defined by information in the appropriate QCC or QCD header entry for JPEG 2000. Based on visual or MSE-based weighting or statistical properties of images, an order of standards and bitplanes can be derived that reflects the importance of a bit plane in a given subband. Based on, e.g., MSE importance, the ordering of importance of bit planes in a subband of a 5-level decomposition is given by the one displayed in Table 2.

TABLE 2

Order of importance of bitplanes and subbands based on MSE weighting.

| order in i (least important, 1 = 1; to most important) | bitplane b(i) | subband s(i) | level l(i) |
|---|---|---|---|
| 1 | 1st bitplane | HH | level 1 |
| 2 | 1st bitplane | LH/HL | level 1 |
| 3 | 1st bitplane | HH | level 2 |
| 4 | 2nd bitplane | HH | level 1 |
| 5 | 1st bitplane | LH/HL | level 2 |
| 6 | 1st bitplane | HH | level 3 |
| 7 | 2nd bitplane | LH/HL | level 1 |
| 8 | 2nd bitplane | HH | level 2 |
| 9 | 1st bitplane | LH/HL | level 3 |
| 10 | 1st bitplane | HH | level 4 |
| 11 | 3rd bitplane | HH | level 1 |
| 12 | 2nd bitplane | LH/HL | level 2 |
| 13 | 2nd bitplane | HH | level 3 |
| 14 | 1st bitplane | LH/HL | level 4 |
| 15 | 1st bitplane | HH | level 5 |
| 16 | 3rd bitplane | LH/HL | level 1 |
| 17 | 3rd bitplane | HH | level 2 |
| 18 | 2nd bitplane | LH/HL | level 3 |
| 19 | 2nd bitplane | HH | level 4 |
| 20 | 4th bitplane | HH | level 1 |
| 21 | 3rd bitplane | LH/HL | level 2 |
| 22 | 3rd bitplane | HH | level 3 |
| 23 | 2nd bitplane | LH/HL | level 4 |
| 24 | 2nd bitplane | HH | level 2 |
| 25 | 4th bitplane | LH/HL | level 1 |
| 26 | 4th bitplane | HH | level 2 |
| 27 | 3rd bitplane | LH/HL | level 3 |
| 28 | 3rd bitplane | HH | level 4 |
| 29 | 2nd bitplane | LH/HL | level 5 |
| . | . | . | . |
| . | . | . | . |
| . | . | . | . |

The estimation algorithm uses that order and computes for each codeblock for order number i, the number of coding passes CP(b(i)) that contain the specific bitplane, b(i), in the subband, s(i), and the corresponding level, 1(i), namely $$CP(b(i)) = CP - ((\text{Max}B(s(I), 1(i)) - b(i)) * 3 + 1) \quad (2)$$

If that number is positive, a specific number of bits is subtracted from the codeblock bits. In one embodiment, the specific number of bits is computed as the average number of bits per coding pass in the specific subband, or the specific resolution. In the next step, order number (i+1), the derived number of bits is subtracted in a similar way from the codeblocks for bitplane b(i+1) of subband s(i+1) at level l(i+1). In pseudo code, an exemplary estimation algorithm for the example target rate of 0.5 bits/pixel is expressed as follows.

```
Max_I=largest_order_number
target_rate = 0.5
new_B = B;
new_CP = CP;
i=1
while ((i≦max_i) && (new_rate>target_rate)){
    for each codeblock m in subband s(i)
        elim_CP[m](b(i)) = new_CP[m]−((MaxB(s(i),l(i))−b(i))*3+1);
        if(elim_CP[m](b(i)) > 0)
            av_bits = new_B[m](s(i))/new_CP[m](s(i));
            new_B[m] −= av_bits*elim_CP[m](b(i));
            if(new_B[m]<0) new_B[m] = 0;
            new_CP[m] −= elim_cp[m](b(i));
        end
    end
    new_rate = sum(new_B*8)/ImageSize;
    i++;
end
```

New_B and new_CP are arrays of size of the number of codeblocks.

Once the target rate is reached, the new estimated bit values "new_B" are used in the entropy processing algorithms.

There are many alternatives to estimating a low bit rate image from a high bit rate image. In an alternative embodiment, another approach for estimation of low bit rate images may be used. This, approach uses a model on the distribution of wavelet coefficients of an image.

It is assumed that the distribution of the wavelet coefficients can be described by a Gaussian or Laplacian distribution. The latter one is often used for modeling in the literature since distributions of many natural images are tested to follow the exponential distribution approximately. The Laplacian distribution has density $$f(x) = \lambda e^{-\lambda |x|} \text{ for } \lambda > 0 \quad (3)$$

The theoretical definition of the entropy is $$H = -\Sigma p_i \log(p_i) \quad (4)$$

where $p_i$ is the probability of an event $A_i$, i.e. $p_i = P(A_i)$. For a lossy compressed image, the events are the situations that coefficients fall into specific quantization bins. In the case of scalar quantization with quantizer Q the event $A_i$ is described as the event that a coefficient is in the interval $[i*2^Q, (i+1)*2^Q)$, i.e.

$$p_i = P(A_i) = P(\text{wavelet coefficient de}[i*2^Q, (i+1)*2^Q)) \quad (5)$$

For the Laplacian distribution, this results in $$p_i = e^{-\lambda i 2^Q} - e^{\lambda (i+1) 2^Q} \quad (6)$$

If the parameter λ could be estimated from the header data of a coding unit, then the pdf of the coefficients in that coding unit could be estimated and the entropy for any given quantizer Q be determined.

The packet headers of a JPEG 2000 file include information on the number of zero bitplanes in a codeblock. From this information an estimation on the maximum absolute values of coefficients in that codeblock can be obtained by the variable MaxB from Equation 1. Using this variable, the parameter λ can be estimated as $$\lambda^* = \log_2(\text{\#coefficients per codeblock})/(2^{\text{MaxB}}) \quad (7)$$

By inserting this estimate into the formulas in Equations (6) and (4), an estimate for the entropy given a specific quantization is obtained. The value H yields bits per pixel. Since the codeblock length is measured in bytes, the estimated value H has to be multiplied by 8*(#coefficients per codeblock). A final algorithm may use the same order as the previously described method to reduce the number of bits in different subbands at different resolution levels successively. The reduction of bits is given by setting the quantizer to the bitplane parameter b(i) from Table 2.

By exploiting the multi-scale entropy distribution that is accessible from the header, techniques may be used to perform image analysis or computer vision and similar operations such as, for example, but not limited to, segmentation. In one embodiment, instead of the exact sample-wise multi-scale entropy distribution, the entropy distribution over local blocks of multi-scale coefficients (such as code blocks in JPEG 2000), a granular entropy distribution, is available. In one embodiment, the granular entropy distribution is used to process the underlying image.

As described herein, the use of multi-scale information from an image available in JPEG 2000 headers is demonstrated in the framework of several image analysis algorithms (or computer vision). In one embodiment, the header parameters that are used are PPM, PPT, SIZ, COD, COC, QCC and QCD. From these parameters, the location of codeblocks in the wavelet domain and the number of bits used by the encoder to encode the corresponding coefficients can be extracted. These numbers can be used to derive a bit distribution of the multi-scale representation of the image. The scale and spatial localization of codeblocks, and the multi-scale bit distribution inferred from headers lead to different image processing applications such a multiscale segmentation.

A classification technique assigns a class label to each small area in an image. Such an area can be an individual pixel or a group of pixels, e.g. pixels contained in a square block. Various image analysis techniques use the class assignments in different ways, for example, the segmentation techniques separate an image into regions with homogeneous properties, e.g. same class labels.

Using the multi-scale entropy distribution, a scale is assigned as the class label to each image region, so that even if the coefficients from the finer scales is ignored, the visual relevant information about the underlying region is retained at the assigned scale. Such labeling identifies the frequency bandwidth of the underlying image features. Segmentation is posed as an optimization problem, and a statistical approach is invoked to solve the problem.

The location of codeblocks in the wavelet domain is given by the two-dimensional (2D) spatial location (i,k) and scale j. For example, if processing an image of size 512×512 and having codeblocks of size 32×32, there are 8×8 of size 32×32 codeblocks in each band of level 1, 4×4 codeblocks per band at level 2, and 2×2 codeblocks per band at level 3. The number of bits $B_j(i,k)$ per codeblock location (i,k) at level j for the three different bands LH, HL and HH at level j are added to yield the number of bits necessary to code the total coefficients at wavelet domain location (i,k). In practice, a linear or non-linear combination of the different entropies can also be used to help distinguish between vertical and horizontal features.

A scale j∈ {1 ... J} is assigned to each block, so that a cost function Λ is maximized, $$S_{opt} = \arg \max_{S \in \{1...J\}^{M \times N}} \Lambda(S, B) \qquad (8)$$

where $S_{opt}$ is the optimal segmentation map for the entire image, S is one of the $J^{MN}$ possible labeling of blocks of size M×N with each block assigned one of the scales in {1 ... J}, and Λ(S, B) yields the cost given any segmentation S and any entropy distribution B.

In one embodiment, the prior art Maximum A Posteriori ("MAP") approach is adopted from statistics to solve the segmentation problem, because such an approach can be tuned to suit the final application. The basic ingredients used by MAP to set the cost function Λ are the likelihood P(B|S), which is the probability of the image's entropy distribution B, given segmentation map S, and prior P(S), which is the probability of the segmentation map S. The MAP cost function Λ is given by $$\Lambda(B,S) = P(B,S) = P(B|S)P(S) \text{(Bayes' rule)}. \qquad (9)$$

The MAP segmentation solution corresponds to optimizing equation (8), using equation (9).

The coefficients contained in a codeblock at level 1 contain information about a block of approximately twice the size in the pixel domain. If the pixel domain is divided into blocks of a specific size there are four times as many blocks in the pixel domain than codeblocks at level 1 of the wavelet decomposition, 16 times as many blocks in the pixel domain than codeblocks at level 2 of the wavelet decomposition, etc. Therefore, bits of a codeblock $B_j(i,k)$ of size n×n contribute information to a block in the pixel domain of size $2^j n \times 2^j n$ at location $(i2^j n, k2^j n)$. Reversely, a pixel block of size n×n at location (x,y) receives a fraction of the bits, estimated as $1/4^j$, from codeblocks $B_j(i,k)$ with $$i = \left\lfloor \frac{x}{2^j} \right\rfloor$$

and $$k = \left\lfloor \frac{y}{2^j} \right\rfloor.$$

In one embodiment, the number of level-j bits associated with the pixel domain is defined as $$\hat{B}_j(x, y) = \frac{B_j(i, k)}{4^j} \qquad (10)$$

The above calculation is equivalent to piece wise interpolation of the entropy values. Other interpolation algorithms, such as, for example, polynomial interpolation or other non-linear interpolation, can be used as well to calculate the level j bits.

The cumulative weighted resolution-j entropy of a pixel block of size 2 n×2 n at location (x,y) is given by $$\hat{B}_j^{pixel}(x, y) = \sum_{l=1}^{J} \gamma_{j,1} \hat{B}_1(i, k) \qquad (11)$$

with $$i = \left\lfloor \frac{x}{2^l} \right\rfloor$$

and $$k = \left\lfloor \frac{y}{2^l} \right\rfloor$$

for the locations i and k in $\hat{B}_j(i, k)$ in equation (10) and weights $\gamma_{j,1}$. An example for a collection of weights is $$\gamma_{j,1} = 0 \text{ for } 1 < j \text{ and } \gamma_{j,1} = w_j \text{ for } 1 \geq j \qquad (12)$$

with $w_0=1$, $w_1=3.5$, $w_2=5.5$, $w_3=13$, $w_4=20$. The parameters $w_i$ and the weights $\gamma_{j,1}$ may be changed depending on the application. The set of values $\hat{B}_j^{pixel}$ is called the cumulative weighted entropy of the image at resolution j.

The likelihood for the entropy $\hat{B}_j^{pixel}(x,y)$ of a pixel domain block at location (x,y) is set to be the value of $\hat{B}_j^{pixel}(x,y)$ relative to the total weighted bits for all levels associated with the pixel domain location (x,y), namely $$P(\hat{B}^{pixel}(x, y) | S(x, y) = j) = \frac{\hat{B}_j^{pixel}(x, y)}{\sum_{l=1}^{J} \hat{B}_1^{pixel}(x, y)} \qquad (13)$$

Under the assumption of the pixel domain blocks being independent, the total likelihood is given by $$P(B | (S = j)) = \prod_{(x,y)} P(\hat{B}^{pixel}(x, y) | (S(x, y) = j)). \qquad (14)$$

$\hat{B}^{pixel}$ provides a multiscale entropy distribution for the original image.

Now the prior P(s) has to be determined. The following discussion reflects existing knowledge about typical segmentation maps. There are many possible ways to choose the prior. For example, other ways to choose the prior are described in R. Neelamani, J. K. Romberg, H. Choi, R. Riedi, and R. G. Baraniuk, "Multiscale image segmentation using joint texture and shape analysis," in Proceedings of Wavelet Applications in Signal and Image Processing VIII, part of SPIE's International Symposium on Optical Science and Technology, San Diego, Calif., July 2000; H. Cheng and C. A. Bouman, "Trainable context model for multiscale segmentation," in Proc. IEEE Int. Conf. on Image Proc.-ICIP '98, Chicago, Ill., Oct. 4-7, 1998; and H. Choi and R. Baraniuk, "Multiscale texture segmentation using wavelet-domain hidden Markov models," in Proc. 32nd Asilomar Conf. on Signals, Systems and Computers, Pacific Grove, Calif., Nov. 1-4, 1998.

Because the segmentation map is expected to have contiguous regions, a prior is set on each location (x, y) based on its immediate neighborhood N(x, y), which consists of nine blocks (using reflection at the boundaries). The individual prior is $$P(S(x, y) \mid N(x, y)) = \frac{(\#(N(x, y) = s(x, y)))^\alpha}{\sum_{j=1}^{J} (\#(N(x, y) = j))^\alpha}, \quad (15)$$

where #(N(x, y)=S(x, y)) is the number of neighbors which are the same as S(x,y), and α is a parameter that can be increased to favor contiguous regions; α=0 implies that the segmentation map blocks are independent of each other. In one embodiment, the overall prior is chosen as $$P(S) = \prod_{x,y} P(S(x, y) \mid N(x, y)) \quad (16)$$

$$= \prod_{x,y} (\#(N(x, y) = S(x, y))^\alpha. \quad (17)$$

In one embodiment, α equals 0.02 to 0.08. The desired segmentation map can now be obtained by optimizing the cost function Λ(S, B). A number of prior art iterative techniques may be used to search for the local maxima. One iterative technique involves first calculating the initial segmentation map that optimizes the cost function using α=0 in equation (12). The segmentation map maximizing the resulting cost function is obtained because the vector optimization decouples into a scalar optimization problem. The segmentation map is given by $$S^0(a, b) = \arg\max_{j \in \{1...J\}} P(\hat{B}^{pixel}(x, y) \mid S(x, y) = j), \text{ for all } (x, y) \quad (18)$$

For all (x, y), the segmentation map at (x, y) is updated using $$S^m(x, y) = \quad (19)$$
$$\arg\max_{j \in \{1...J\}} P(\hat{B}^{pixel}(x, y) \mid S(x, y) = j) P(S(x, y) = j \mid N(x, y)),$$

where N(x, y) is obtained from $S^{m-1}$. Each iteration, m is incremented to m=m+1. The iterative loop is repeated until $S^m = S^{m-1}$. The iterative algorithm always converges, because the cost function Λ(B,$S^m$) is a non-decreasing function with iterations m, and the cost function is bounded. The $S^m$ obtained after convergence is the segmentation estimate.

The actual segmentation output in terms of labeling of regions is then given by the maximization of the MAP cost function $$\Lambda(B, S_m) = P(B \mid S_m) \cdot P(S_m)), \quad (20)$$

as stated in equation (3) above.

Figure 11:
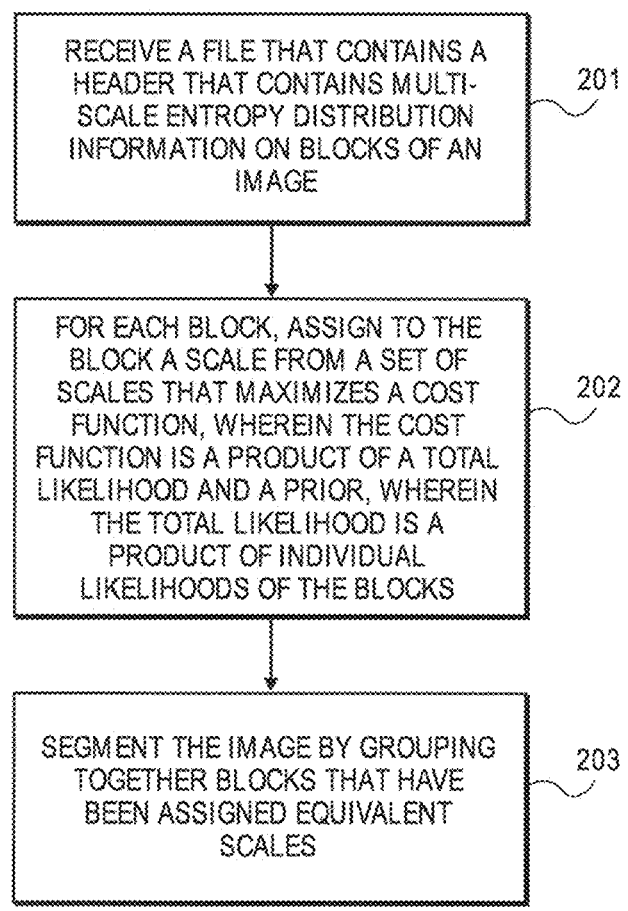
FIG. 11 is a flow diagram illustrating one embodiment of a process for segmenting an image.

FIG. 11 is a flow diagram of one embodiment of a process for segmenting an image. Referring to FIG. 11, in processing block 201, a file that contains a header that contains multi-scale entropy distribution information on blocks of an image is received. In one embodiment, the file represents an image in JPEG 2000 format. In processing block 202, for each block, a scale from a set of scales is assigned to the block that maximizes a cost function. The cost function is a product of a total likelihood and a prior. The total likelihood is a product of likelihoods of the blocks. In one embodiment, each likelihood of a block is proportional to a summation, for each scale in the set of scales, of a product of a weight of the scale and a number of bits spent to code the block at the scale. In one embodiment, the number of bits spent to code the block at the scale is a numerator divided by a denominator. The numerator is an entropy distribution of a multi-scale coefficient of the block at the scale. The denominator is four raised to the power of the scale. In processing block 203, the image, is segmented by grouping together blocks that have been assigned equivalent scales.

Figure 12:
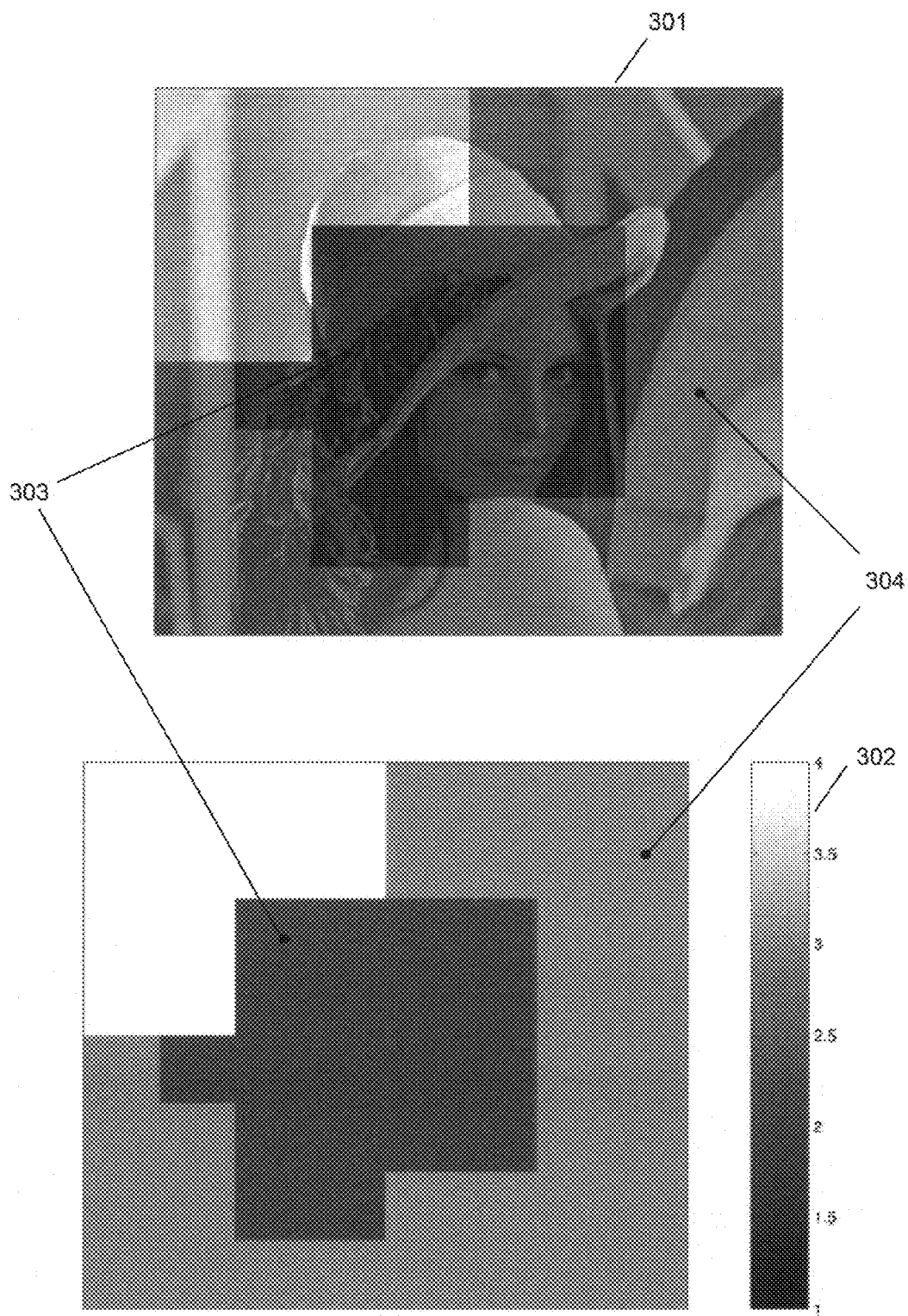
FIG. 12 illustrates a segmentation map superimposed on an exemplary image of a woman.

FIG. 12 illustrates a segmentation map superimposed on an exemplary image of a woman. In one embodiment, the segmentation process (set forth above) labels the face regions of the image 301 with finer scales, and labels the background regions with coarser scales to reflect the underlying features in the image. The different shades show that the regions with different types of features are identified differently. In one embodiment, the segmentation process assigns a scale to the different regions on the basis of the underlying features. The color-bar 302 on the right shows the scales assigned to the different regions. Regions such as the face that contain many edges are labeled with a fine scale 303. In contrast, the background regions are assigned coarser scales 304.

An Exemplary Computer System

Figure 9:
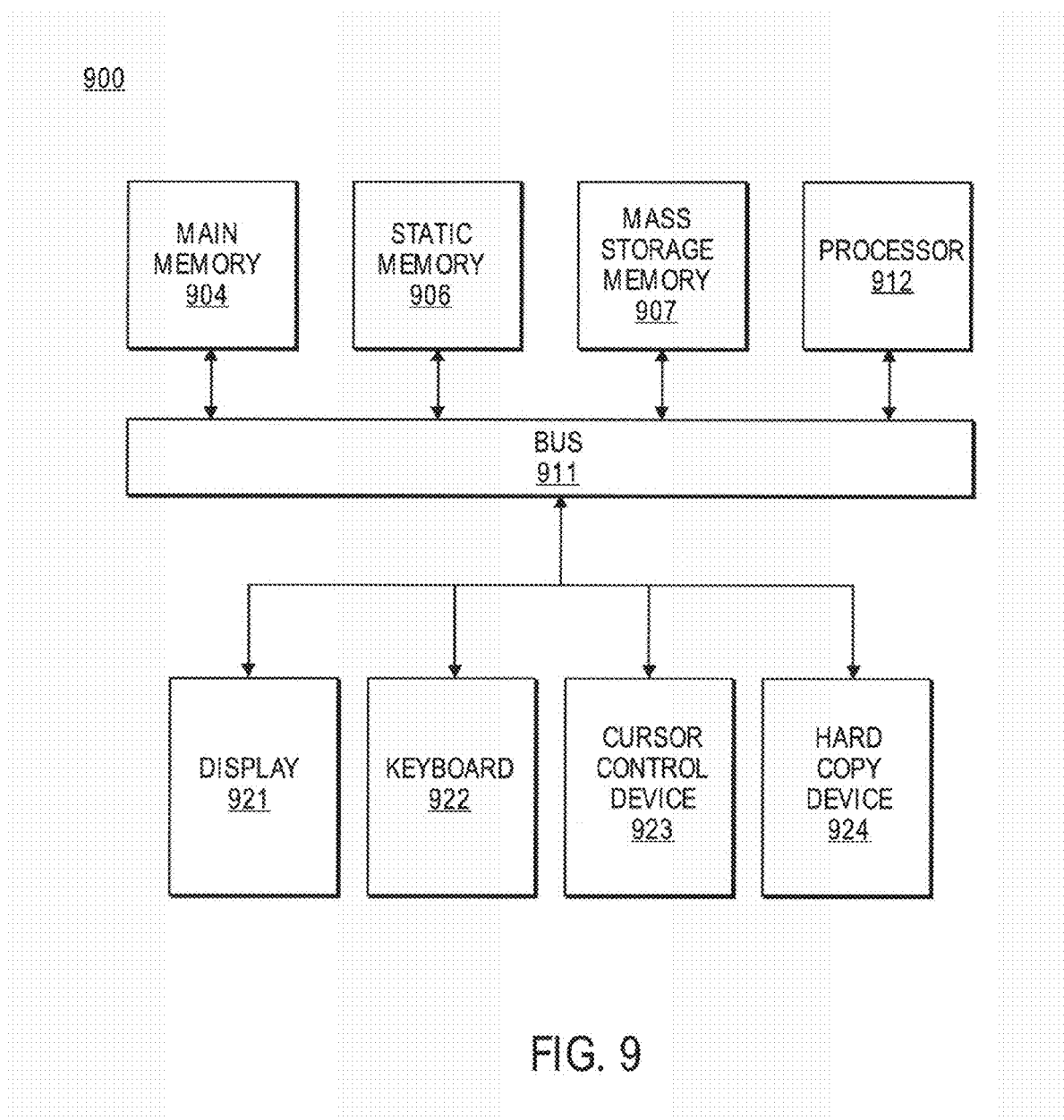
FIG. 9 is a block diagram of an exemplary computer system.

FIG. 9 is a block diagram of an exemplary computer system that may perform one or more of the operations described herein. Referring to FIG. 9, computer system 900 may comprise an exemplary client 950 or server 900 computer system. Computer system 900 comprises a communication mechanism or bus 911 for communicating information, and a processor 912 coupled with bus 911 for processing information. Processor 912 includes a microprocessor, but is not limited to a microprocessor, such as, for example, Pentium™, PowerPC™, etc.

System 900 further comprises a random access memory (RAM), or other dynamic storage device 904 (referred to as main memory) coupled to bus 911 for storing information and instructions to be executed by processor 912. Main memory 904 also may be used for storing temporary variables or other intermediate information during execution of instructions by processor 912.

Computer system 900 also comprises a read only memory (ROM) and/or other static storage device 906 coupled to bus 111 for storing static information and instructions for processor 912, and a data storage device 907, such as a magnetic disk or optical disk and its corresponding disk drive. Data storage device 907 is coupled to bus 911 for storing information and instructions.

Computer system 900 may further be coupled to a display device 921, such as a cathode ray tube (CRT) or liquid crystal display (LCD), coupled to bus 911 for displaying information to a computer user. An alphanumeric input device 922, including alphanumeric and other keys, may also be coupled to bus 911 for communicating information and command selections to processor 912. An additional user input device is cursor control 923, such as a mouse, trackball, trackpad, stylus, or cursor direction keys, coupled to bus 911 for communicating direction information and command selections to processor 912, and for controlling cursor movement on display 921.

Another device that may be coupled to bus 911 is hard copy device 924, which may be used for printing instructions, data, or other information on a medium such as paper, film, or similar types of media. Furthermore, a sound recording and playback device, such as a speaker and/or microphone may optionally be coupled to bus 911 for audio interfacing with computer system 900. Another device that may be coupled to bus 911 is a wired/wireless communication capability 925 to communication to a phone or handheld palm device.

Note that any or all of the components of system 900 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method comprising:
   accessing header information from a multi-resolution codestream of compressed data of a first image;
   deriving one or more retrieval attributes solely from a bit distribution extracted from the header information; and
   performing image analysis based on the one or more retrieval attributes from the bit distribution extracted from header information, wherein the one or more retrieval attributes are non-image data that describe visual attributes of the first image, wherein the image analysis comprises similarity matching or clustering between the first image and a second image.

2. The method defined in claim 1 wherein the header information comprises a number of bits per codeblock.

3. The method defined in claim 1 wherein the multi-resolution codestream complies with the JPEG 2000 Standard.

4. The method defined in claim 1 wherein the image analysis comprises categorization.

5. The method defined in claim 1 wherein deriving the one or more retrieval attributes comprises creating a first vector of the one or more retrieval attributes, and performing image analysis comprises comparing the first vector with a second vector of one or more retrieval attributes associated with the second image.

6. The method defined in claim 1 further comprising performing retrieval of the second image based on a result of image analysis.

7. The method defined in claim 1 wherein the one or more retrieval attributes comprise one or more resolution-sensitive features.

8. The method defined in claim 1 wherein the one or more retrieval attributes comprise one or more selected from a group consisting of one or more content percentages relating to an amount of one or, more of text, image, color and background in the first document image, one or more statistics of connected components in at least one resolution-level segmentation map, spatial relationships between components in one or both of the at least one resolution-level segmentation map and one or more bit distribution images, one or more histograms for code block partition, one or more resolution-level histograms, column layout, and one or more of projection histograms of text blocks, background blocks, color blocks, and resolution values in the at least one resolution-level segmentation map.

9. The method defined in claim 1 wherein the first image comprises a scanned compound document.

10. The method defined in claim 1 wherein deriving the one or more retrieval attributes comprises computing the one or more retrieval attributes.

11. The method defined in claim 1 wherein the codestream includes a plurality of layers of coded data and where accessing the header information comprises accessing header data connected with one of the layers.

12. The method defined in claim 11 wherein the plurality of layers comprises a luminescence layer, a chrominance layer, and a layer for the remaining bits.

13. A non-transitory computer readable media having one or more-recordable media storing instructions thereon which, when executed by a system, cause the system to perform a method comprising:
   accessing header data from a multi-resolution codestream of compressed data of a first image;
   deriving one or more retrieval attributes solely from a bit distribution extracted from the header information; and
   performing image analysis based on the one or more retrieval attributes from the bit distribution extracted from header information, wherein the one or more retrieval attributes are non-image data that describe visual attributes of the first image, wherein the image analysis comprises similarity matching or clustering between the first image and a second image.

14. The computer readable media defined in claim 13 wherein the header information comprises a number of bits per codeblock.

15. The computer readable media defined in claim 13 wherein the multi-resolution codestream complies with the JPEG 2000 Standard.

16. The computer readable media defined in claim 13 wherein deriving one or more retrieval attributes comprises creating a first vector of the one or more retrieval attributes, and performing image analysis comprises comparing the first vector with a second vector of one or more retrieval attributes associated with the second image.

17. The computer readable media defined in claim 13 wherein the method further comprises performing retrieval of the second image based on a result of image analysis.

18. The computer readable media defined in claim 13 wherein the one or more retrieval attributes comprise one or more resolution-sensitive features.

19. The computer readable media defined in claim 13 wherein the one or more attributes comprise one or more selected from a group consisting of one or more content percentages relating to an amount of one or more of text, image, color and background in the first document image, one or more statistics of connected-components in the at least one resolution-level segmentation map, spatial relationships between components in one or both of the at least one resolution-level segmentation map and one or more bit distribution images, one or more histograms for code block partition, one or more resolution-level histograms, column layout, and one or more of projection histograms of text blocks, background blocks, color blocks, and resolution values in the at least one resolution-level segmentation map.

20. The computer readable media defined in claim 13 wherein the first image comprises a scanned compound document.

21. The computer readable media defined in claim 13 wherein deriving the one or more retrieval attributes comprises computing the one or more retrieval attributes.

22. The computer readable media defined in claim 13 wherein the codestream includes a plurality of layers of coded data and where accessing the header data comprises accessing header data connected with one of the layers.

23. The computer readable media defined in claim 22 wherein the plurality of layers comprises a luminescence layer, a chrominance layer, and a layer for the remaining bits.

24. An apparatus comprising:
means for accessing header data from a multi-resolution, codestream of compressed data of a first image;
means for deriving one or more retrieval attributes solely from a bit distribution extracted from the header information; and
means for performing image analysis based on the one or more retrieval attributes from the bit distribution extracted from header information, wherein the one or more retrieval attributes are non-image data that describe visual attributes of the first image, wherein the image analysis comprises similarity matching or clustering between the first image and a second image.

* * * * *